United States Patent Office 3,690,844
Patented Sept. 12, 1972

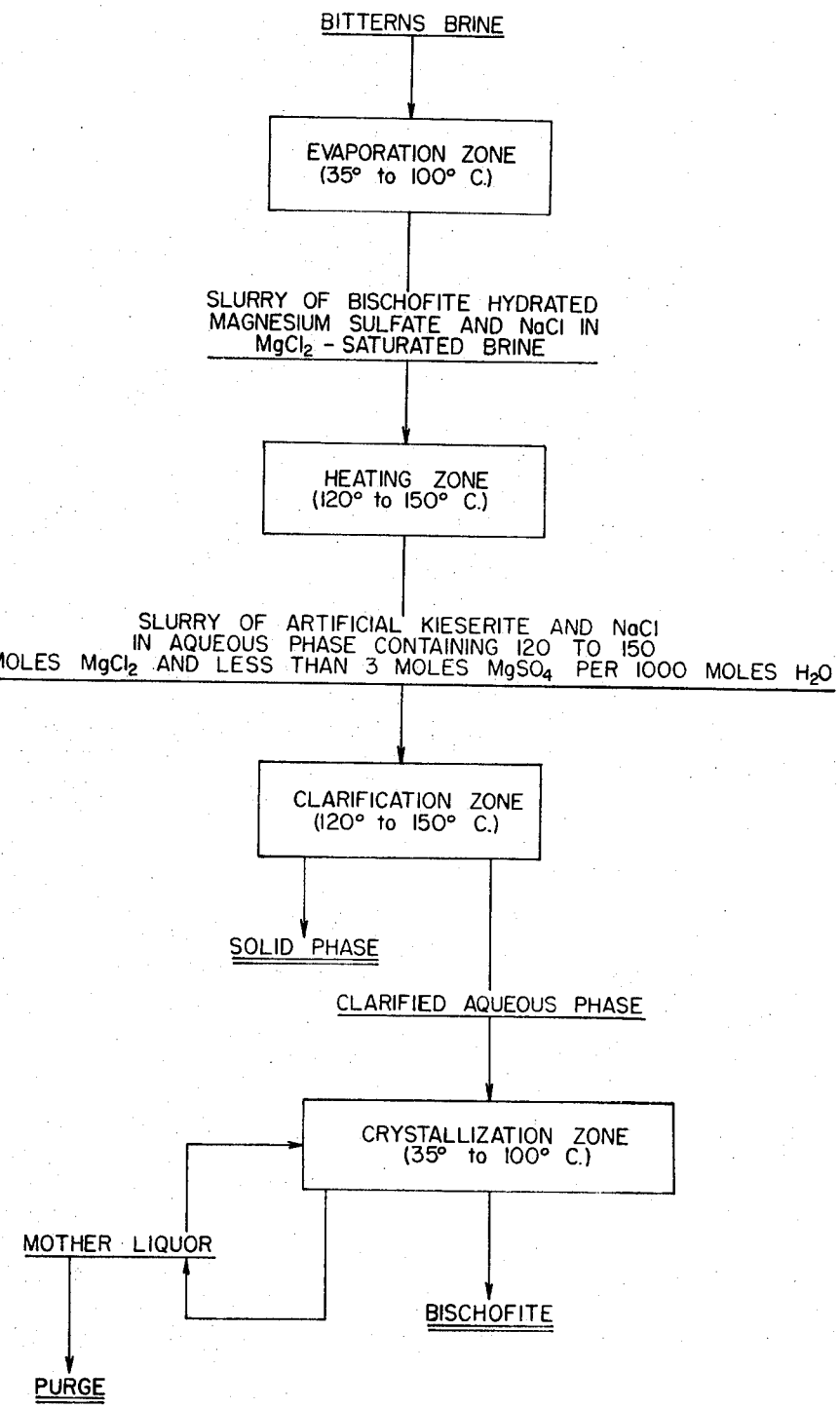

3,690,844
RECOVERY OF SULFATE-FREE HYDRATED MAGNESIUM CHLORIDE FROM SULFATE-CONTAMINATED BRINES
Ulrich E. G. Neitzel and Hans Gerhard Flint, Ogden, Utah, assignors to Great Salt Lake Minerals and Chemicals Corporation, Ogden, Utah
Filed Oct. 17, 1969, Ser. No. 867,337
Int. Cl. C01f 5/30, 5/40; B01d 1/00
U.S. Cl. 23—296
9 Claims

ABSTRACT OF THE DISCLOSURE

Magnesium chloride brine contaminated with sulfate, sodium chloride, and other impurities is evaporated to produce a slurry of hydrated magnesium chloride, hydrated magnesium sulfate, and, in some instances, sodium chloride. The slurry is heated to a temperature at which the solubility of magnesium sulfate is very low and is held at that temperature sufficiently long to permit most of the dissolved sulfate to crystallize as artificial kieserite. Most or all of the magnesium chloride is redissolved at the elevated temperature. The aqueous phase of the slurry is recovered and cooled to produce substantially pure hydrated magnesium chloride, usually bischofite.

BACKGROUND OF THE INVENTION

Field

This invention relates to the recovery of substantially pure hydrated magnesium chloride from brines contaminated with sulfate impurities. Specifically, it provides a method for producing sulfate-free bischofite from slurries containing sulfate-contaminated bischofite, hydrated magnesium sulfate, and other impurities, such as sodium chloride.

State of the art

It is known to evaporate brines which contain both magnesium chloride and magnesium sulfate (such as the bitterns brines recovered from the potash, salt, or other brine industries) to recover magnesium chloride. The magnesium chloride is typically recovered in hydrated form, such as bischofite ($MgCl_2 \cdot 6H_2O$). Bischofite obtained by the evaporation of such bitterns brines in accordance with prior art techniques has contained undesirably high levels of sulfate impurities.

The production of low-sulfate bischofite from brines containing even small amounts of sulfate impurities has involved complicated techniques; these techniques involve chemically treating the brine to remove sulfate impurities. Thus, for example, such brines have been treated with calcium chloride and/or barium chloride to remove sulfate prior to subjecting the brines to evaporation. An alternate procedure involves removing sulfate by first evaporating to crystallize artificial kieserite ($MgSO_4 \cdot 5/4H_2O$) and then treating the hot $MgCl_2$ solution with calcium chloride and barium chloride to remove the residual sulfate. Other procedures for removing sulfate from brines include ion-exchange and solvent-extraction techniques. Each of these known techniques for removing sulfates from brine involves the use of reagents and requires special treating procedures.

Often, bitterns brines may be economicaly evaporated or concentrated in solar evaporation ponds, or otherwise, to remove excess water. There may result from such procedures a slurry of sulfate-contaminated, hydrated magnesium chloride and hydrated magnesium sulfate in an aqueous brine saturated with respect to magnesium chloride. The solid phase of the slurry often contains sodium chloride, and occasionally minor amounts of other constituents, such as langbeinite, carnallite, borates, and iron hydroxide. The bischofite contained in such slurries is unacceptable for most chemical industry applications, notably as feed for electrolytic magnesium cells. Nevertheless, it would usually be uneconomical to discard it; even if it were discarded, the sulfate concentration in the aqueous phase of the slurry would still usually be too high for recovery of low-sulfate bischofite according to presently-available chemical techniques. Accordingly, there is need for a process to recover low-sulfate hydrated magnesium chloride from such slurries, preferably without sacrificing the magnesium chloride values in the solid phase.

SUMMARY OF THE INVENTION

This invention provides a method for manipulating aqueous slurries of sulfate-contaminated hydrated magnesium chloride and hydrated magnesium sulfate (sodium chloride may also be present in the solid phase) to recover at least a major portion of the magnesium chloride values from the solid phase as well as magnesium chloride values from the liquid phase in the form of substantially sulfate-free hydrated magnesium chloride. By the practice of this invention, it is possible to recover from slurries of the aforedescribed type bischofite crystal crops containing less than about 0.03 percent by weight sulfate and negligible amounts of other noxious impurities.

It is within contemplation that a sulfate-contaminated magnesium chloride brine may be subjected to evaporative concentration in solar ponds, or otherwise, to produce a slurry of hydrated magnesium chloride and magnesium sulfate. Other constituents in the initial brine, notably sodium chloride, but including in some instances other constituents, such as water soluble salts of iron, boron, and potassium, among others, may also constitute a portion of the solid phase of the slurry. In any event, the slurry is manipulated with respect to temperatures and holding times to selectively redissolve substantial quantities of magnesium chloride and to significantly reduce the sulfate content of the aqueous phase of the slurry. The aqueous phase is adjusted in composition by these means such that it may be separated and cooled to produce a substantially pure, hydrated magnesium chloride (usually bischofite) crystal crop.

Nearly any magnesium chloride brine (brine containing dissolved magnesium chloride as a principal constituent) which contains magnesium sulfate in either minor or major amounts may be processed in accordance with this invention. Practice of the invention results in a concentrated magnesium chloride brine sufficiently low in sulfate and other impurities of low solubility that, when it is cooled, hydrated magnesium chloride substantially free from noxious impurities may be recovered. Minerals, such as sodium chloride, with relatively temperature-independent water solubility may be concentrated to saturate the aqueous phase, but their co-precipitation with magnesium chloride may be prevented by well-known simple expedients; e.g., the aqueous phase may be diluted slightly prior to cooling. Other dissolved constituents, notably the water soluble alkali metal salts, may be present in the brine, provided their concentrations are sufficiently low that unacceptable quantities are not coprecipitated as impurities with magnesium chloride. Of course, it is within contemplation that the low-sulfate brine may itself be a useful item of commerce for applications other than as a source of hydrated magnesium chloride.

According to this invention, a slurry of the aforedescribed type is heated to a temperature at which hydrated magnesium sulfate tends to crystallize relatively rapidly from solution as artificial kieserite. The slurry is held at this elevated temperature for sufficient duration to permit the crystallization of artificial kieserite therefrom until the actual concentration of magnesium sulfate in the aqueous phase is below about 3 moles, preferably below about 2 moles, $MgSO_4$ per 1000 moles $H_2O$. Depending upon the composition of the slurry introduced to this heating procedure and upon the extent to which its temperature is actually increased, the aqueous phase of the slurry will redissolve all, or substantially all, of the magnesium chloride from the solid phase. The process may be controlled such that the aqueous phase becomes saturated with respect to $MgCl_2$ before all of the hydrated magnesium chloride in the solid phase is redissolved. According to other embodiments, however, all of the magnesium chloride in the solid phase may be redissolved to produce an aqueous phase containing somewhat less than the saturated concentration of magnesium chloride.

After the slurry has been held for sufficient duration at elevated temperature, it is clarified, or otherwise physically separated into its aqueous and solid phases, and the aqueous phase is recovered for further processing. Clarification is desirably done at elevated temperatures to inhibit recrystallization of hydrated magnesium chloride. The aqueous phase recovered from this procedure typically contains about 120 to about 160 moles of $MgCl_2$ and less than about 3 moles of $MgSO_4$ per 1000 moles $H_2O$ when the heating procedure is conducted at temperatures between about 130 and 150° C. High heating and clarification temperatures generally promote settling of the solid phase and result in a more desirable aqueous phase from the standpoint of recovering hydrated magnesium chloride.

At the high concentrations of magnesium chloride contained in the aqueous phase, if the solution is simply allowed to cool to room temperature, it will solidify, entrapping all of the sulfate and other impurities in the brine. Such a technique may be acceptable in certain instances, but it is ordinarily preferable to rely upon a crystallization procedure which yields a higher grade of hydrated magnesium chloride product.

The hot-clarified magnesium chloride brine may be treated in a variety of ways to produce acceptable crystal crops of hydrated magnesium chloride. Various combinations of cooling and evaporation may be employed to obtain low-sulfate bischofite products from brine which is still supersaturated with respect to magnesium sulfate. To produce a good product, however, it is effective to conduct the evaporation at a temperature sufficiently low and at a rate sufficiently high to avoid crystallization of magnesium sulfate. The evaporation may be conducted under vacuum at a temperature lower than about 90° C., preferably below about 80° C., and rarely above 100° C. Evaporation may be continued until the solubility limit of magnesium chloride in the brine is exceeded or it may be discontinued prior to the formation of a crystal crop. It is sometimes advantageous to first evaporate under vacuum to obtain a saturated $MgCl_2$ brine, which may contain crystallized bischofite, and then cool the brine to obtain a crystal crop. The depleted brine is then again subjected to vacuum evaporation, preferably at lower temperatures, and is again cooled to obtain a second crystal crop. In this fashion, bischofite recovery is accomplished at reduced average temperatures and at higher rates, thereby discouraging the concurrent crystallization of magnesium sulfate minerals.

An ideal method for recovering good quality, hydrated magnesium chloride from such brines is to introduce the concentrated magnesium chloride solution to a crystallization zone operating at a temperature sufficient to prevent solidification of the solution, typically about 60° C., usually between about 45 and about 85° C., wherein a mother liquor saturated with respect to magnesium chloride and undersaturated with respect to magnesium sulfate is continuously recycled. A typical recycling mother liquor contains between about 95 and about 110 moles of magnesium chloride and up to about 8 moles of $MgSO_4$ at 60° C. A portion of the mother liquor is continuously purged to prevent undue build-up of sulfate in the crystallizer. Typically, bischofite is recovered in this fashion, although it is possible, by adjusting the operating conditions appropriately, to recover either the dihydrate or tetrahydrate magnesium chloride species.

Recovery of the hydrated magnesium chloride from the residual brine may be effected by any convenient physical separation procedure. Filtration is normally convenient, for example.

DESCRIPTION OF THE DRAWINGS

The single figure of the drawing is a flow sheet illustrating what is presently regarded as the best mode for carrying out the invention.

DESCRIPTION OF THE ILLUSTRATED EMBODIMENT

Bitterns brine is fed to an evaporation zone and is subjected to evaporative concentration, preferably solar evaporation, to form a slurry of bischofite, hydrated magnesium sulfate, and sodium chloride in a saturated aqueous solution of magnesium chloride. The evaporation is usually accomplished at relatively low temperatures, as shown. The bischofite crystal crop formed in this fashion is typically contaminated with magnesium sulfate or other sulfate species so that it would be an unacceptable commercial product, even if physically separated from the remainder of the solid phase.

The slurry is harvested and forwarded to a heating zone operating at temperatures near or above the ambient boiling temperature of the aqueous phase of the slurry. It is often preferable to heat the slurry at elevated temperatures and pressures to increase the solubility of the magnesium chloride and decrease the solubility of magnesium sulfate in the aqueous phase. Usually there is no advantage to evaporating additional water from the slurry during this step. When the temperature of the slurry is raised sufficiently to redissolve all of the hydrated magnesium chloride in the solid phase without producing an aqueous phase saturated with respect to magnesium chloride, additional evaporative concentration may be desirable. In the illustrated instance, the temperature in the heating zone is just sufficient to dissolve substantially all of the hydrated magnesium chloride in the solid phase to produce a saturated magnesium chloride brine.

The residence time of the slurry in the zone is sufficient to permit the sulfate concentration in the aqueous phase to be reduced to below about 2½ moles per 1000 moles water due to the crystallization of artificial kieserite ($MgSO_4.5/4H_2O$). Depending upon the precise solution composition of the aqueous phase and the temperatures selected, minor amounts of NaCl may be either redissolved or crystallized.

The slurry recovered from the heating zone is clarified at temperatures between about 120 and about 150° C., and a clarified concentrated magnesium chloride brine, typically containing about 120 to about 160 moles $MgCl_2$ per 1000 moles $H_2O$ and less than about 2½ moles $MgSO_4$ per 1000 moles water, and other constituents in concentrations below their contaminating concentration (by "contaminating concentration" is meant a concentration which would result in contamination of the subsequent hydrated magnesium chloride product) is separated from the solid phase and is recovered for further processing.

The clarified magnesium chloride brine is introduced to a crystallization zone operating at between about 45 and about 85° C. with a recirculating mother liquor. A portion of the mother liquor is purged to maintain the sulfate concentration in the mother liquor below a contaminating concentration as aforedescribed, typically below about 5 moles per 1000 moles $H_2O$. Bischofite products produced in this fashion contain less than about 0.03 percent by weight sulfate and are sufficiently pure for use as feed to electrolytic magnesium cells.

The following specific example is illustrative of the claimed process:

One mole part unit (a quantity of brine containing 1000 moles $H_2O$, hereinafter "MPU") containing 10 moles $MgSO_4$, 95 moles $MgCl_2$, 0.6 mole $K_2Cl_2$, and 1.0 mole $Na_2Cl_2$ is subjected to evaporation at ambient temperature to remove about 259 moles of water. The resulting crystal crop is harvested and contains 62.3 moles bischofite, 0.80 mole carnallite, 6.64 moles $MgSO_4 \cdot 4H_2O$, and 1.32 moles sodium chloride, together with 0.3359 MPU of entrained brine of substantially the same composition as the initial brine. The crystal crop is heated to 130° C. in a reactor for a residence time of about ½ hour and a slurry of about 8.17 moles artificial kieserite ($MgSO_4 \cdot 5/4H_2O$) in 0.7308 MPU of aqueous phase is recovered. The aqueous phase contains about 2.5 moles $MgSO_4$, 130 moles $MgCl_2$, 0.82 mole $K_2Cl_2$, and 1.37 moles $Na_2Cl_2$ per MPU. The slurry is filtered to remove the solid phase and the aforedescribed aqueous phase is cooled to about 70° C. to produce a first bischofite crystal crop containing about 38.07 moles bischofite, 0.52 mole carnallite, and 1.2 moles NaCl. About 0.4993 MPU of residual liquor is separated from the first bischofite crystal crop and is additionally cooled to about 25° C. to produce a second bischofite crystal crop containing about 20.69 moles bischofite, 0.21 mole carnallite and 0.2 mole NaCl and about 0.3734 MPU of discard brine containing about 4.89 moles $MgSO_4$, 95 moles $MgCl_2$, 0.65 mole $K_2Cl_2$, and 0.8 mole $Na_2Cl_2$ per MPU. Both bischofite crystal crops are substantially sulfate free; i.e., neither contains as much as 0.05 percent by weight sulfate as $SO_4^=$.

Reference herein to details of certain specific embodiments is not intended to restrict the scope of the claims which themselves recite those features regarded as essential to the invention.

We claim:

1. A method for the production of hydrated magnesium chloride from bitterns brine contaminated with sulfate impurities, which comprises:
   concentrating said brine until magnesium chloride and magnesium sulfate both precipitate from solution, thereby forming a slurry containing at least about 120 moles of $MgCl_2$ per 1000 moles $H_2O$;
   heating said slurry to a temperature between about 130 and about 150° C. to dissolve selectively magnesuim chloride from its solid phase to form an aqueous phase containing at least about 120 moles $MgCl_2$ per 1000 moles $H_2O$;
   separating the aqueous phase of said slurry from the solid phase thereof; and
   cooling said aqueous phase to cause the crystallization therefrom of hydrated magnesium chloride substantially free of sulfate impurities.

2. A method according to claim 1, wherein the brine is concentrated by evaporating it at temperatures between about 35 and about 100° C., thereby crystallizing bischofite, hydrated magnesium sulfate, and sodium chloride, and the slurry is heated to a temperature at which the solubility of magnesium sulfate is less than about 3 moles per 1000 moles water and is held at that temperature until the concentration of $MgSO_4$ in the aqueous phase of said slurry is less than about 3 moles per 1000 moles water prior to separating said aqueous phase.

3. A method according to claim 2, wherein the slurry is heated to a temperature between about 130 and about 150° C. to redissolve selectively bischofite and reduce the concentration of $MgSO_4$ in the aqueous phase of said slurry to below about 2½ moles per 1000 moles $H_2O$.

4. A method according to claim 1, wherein after the aqueous phase of the slurry is separated, it is cooled in a crystallization zone operating with a circulating mother liquor containing at least about 100 moles $MgCl_2$ per 1000 moles of water to produce substantially sulfate-free hydrated magnesium chloride.

5. A method according to claim 4, wherein sufficient purge is taken from the circulating mother liquor to maintain the $MgSO_4$ concentration therein below about 5 moles per 1000 moles of water.

6. A method for recovering substantially sulfate-free hydrated magnesium chloride from a slurry containing at least about 130 moles $MgCl_2$ per 1000 moles $H_2O$ and containing sulfate-contaminated hydrated magnesium chloride and hydrated magnesium sulfate in its solid phase, which comprises:
   heating said slurry to a temperature between about 120 and about 150° C. at which $MgSO_4$ tends to crystallize from solution as artificial kieserite;
   holding the slurry at such temperature to permit artificial kieserite to crystallize therefrom and to redissolve hydrated magnesium chloride until the aqueous phase of said slurry contains less than about 3 moles of $MgSO_4$ and between about 120 and about 160 moles $MgCl_2$ per 1000 moles of water;
   separating and recovering said aqueous phase of said slurry; and
   cooling said aqueous phase in a crystallization zone with circulating mother liquor to produce substantially sulfate-free hydrated magnesium chloride.

7. A method according to claim 6, wherein the solid phase of the initial slurry includes sodium chloride; and the slurry includes other soluble constituents in amounts below those which would result in contaminating concentrations in the aqueous phase ultimately subjected to cooling.

8. A method according to claim 6, wherein the slurry is heated to at least about the ambient boiling point of its aqueous phase; the slurry is held at said temperature until the sulfate concentration in the aqueous phase is reduced to below about 2½ moles per 1000 moles water; the slurry is recovered and clarified; and the aqueous phase of said slurry is introduced to a crystallization zone operating at between about 45 and about 85° C. to produce a bischofite product containing less than about 0.05 percent by weight sulfate.

9. A method according to claim 8, wherein the slurry is heated to a temperature between about 130 and about 150° C. and is clarified at a temperature between about 130 and about 150° C.

References Cited

UNITED STATES PATENTS

| | | | |
|---|---|---|---|
| 1,727,597 | 4/1971 | Heath | 23—298 |
| 2,687,339 | 8/1954 | Dancy | 23—297 |
| 2,479,001 | 8/1949 | Burke | 23—304 |
| 1,432,796 | 10/1922 | Silsbee | 23—297 |
| 3,499,725 | 3/1970 | Scarfi | 23—304 |

NORMAN YUDKOFF, Primary Examiner

S. J. EMERY, Assistant Examiner

U.S. Cl. X.R.

23—91, 128, 297, 299, 304